United States Patent [19]

Faulkerson et al.

[11] Patent Number: 4,901,364
[45] Date of Patent: Feb. 13, 1990

[54] INTERACTIVE OPTICAL SCANNER SYSTEM

[75] Inventors: James L. Faulkerson, Woodside; Edward J. Menard, Sunnyvale, both of Calif.

[73] Assignee: Everex Ti Corporation, Calif.

[21] Appl. No.: 912,834

[22] Filed: Sep. 26, 1986

[51] Int. Cl.$^4$ .............................................. G06K 9/22
[52] U.S. Cl. ..................................... 382/59; 358/903; 382/65; 341/23
[58] Field of Search ...................... 382/59, 65; 358/29, 358/227, 228, 903; 340/365 VL

[56] References Cited

U.S. PATENT DOCUMENTS

| 4,088,981 | 5/1978 | Gott | 340/146.3 |
| 4,118,687 | 10/1978 | McWaters et al. | 340/146.3 |
| 4,158,194 | 6/1979 | McWaters et al. | 340/146.3 |
| 4,680,729 | 7/1987 | Steinhart | 340/365 VL |

FOREIGN PATENT DOCUMENTS 2128005  4/1984  United Kingdom ......... 340/365 VL

OTHER PUBLICATIONS

Frank Jay (ed.), IEEE Standard Dictionary of Electrical and Electronic Terms, 1984, p. 662.
"Using IBM's Marvelous Keyboard," BYTE Publications, Inc., May. 1983.
Key Tronic 1200 Series Hand Held Wand+Guide Mask.

Primary Examiner—Leo H. Boudreau
Attorney, Agent, or Firm—Roberts and Quiogue

[57] ABSTRACT

An interactive optical scanner system for use with a host computer or terminal comprising a central processor and a keyboard having a plurality of keyboard character and function keys to allow entry of keyboard character and function data to the central processor in accordance with predetermined keyboard codes. The system includes a camera enclosed in a camera housing suitable for hand-held use. The camera comprises an opto-electronic transducer array disposed within the housing for capturing successive images of characters on a medium surface and providing digital video signals representative of the images. The camera includes a plurality of tactilely-operated camera function keys disposed on the housing for providing respective camera function key token signals corresponding to each camera function key in dependence on the user manipulation thereof. The system includes user-programmable means responsive to the respective camera function key token signals for associating a particular key token signal with a programmable output value corresponding to one or more keyboard character or keyboard function keys or sequences or keys associated with the computer keyboard.

6 Claims, 2 Drawing Sheets

INTERACTIVE OPTICAL SCANNER SYSTEM

BACKGROUND OF THE INVENTION

The present invention relates to optical scanners employed for optical character recognition (OCR), and more particularly to an improved hand-held optical scanner employed in an OCR system and provided with a plurality of user-programmable function controls.

Optical scanners for specific OCR applications have been in use for some time. Examples of exemplary hand-held scanners are shown in U.S. Pat. Nos. 3,947,817 and 4,240,748.

U.S. Pat. No. 4,088,981 is directed to an automated data entry and display system particularly adapted to reading of bank checks, bonds and like documents, which includes character scanning wand 1 having a keypad 11 containing nine miniature keys 12. A number of the keys are said to be capable of duplicating the functions of keys on a standard keyboard computer terminal, such as the "transmit," "tab forward" and "home" keys. The keys further include an "enable" key to enable the wand output. The patent does not appear to teach the use of an optical scanner having user-programmable control over the functions achieved by the operator controls on the scanner.

It would therefore represent an advance in the art to provide an interactive optical scanner system employing a hand-held optical scanner having a plurality of function keys whose respective functions are programmable by the system user.

SUMMARY OF THE INVENTION

An interactive optical scanner system is disclosed for use in combination with a host computer or terminal comprising a central processor and a keyboard having a plurality of keyboard character and function keys to allow entry of keyboard character and function data to the central processor in accordance with predetermined keyboard codes. The system includes a camera enclosed in a camera housing suitable for hand-held use. The camera comprises an opto-electronic transducer array disposed within the housing for capturing successive images of characters on a medium surface and providing digital video signals representative of the images.

The camera includes a plurality of tactilely-operated camera function keys disposed on the housing for providing respective camera function key token signals corresponding to each camera function key in dependence on the user manipulation thereof.

The system includes user-programmable means responsive to the respective camera function key token signals for associating a particular key token signal with a programmable output value corresponding to one or more keyboard character or keyboard function keys or sequences of keys associated with the computer keyboard. Means are provided for transforming the respective output values into scanner system signals corresponding to the keyboard codes and coupling the system signals to the central processor unit so that the camera function key manipulation emulates the operation of one or more keyboard keys. The invention allows the user to program the functions associated with the camera function keys to the requirements of a particular application.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE DISCLOSURE

Figure 1:
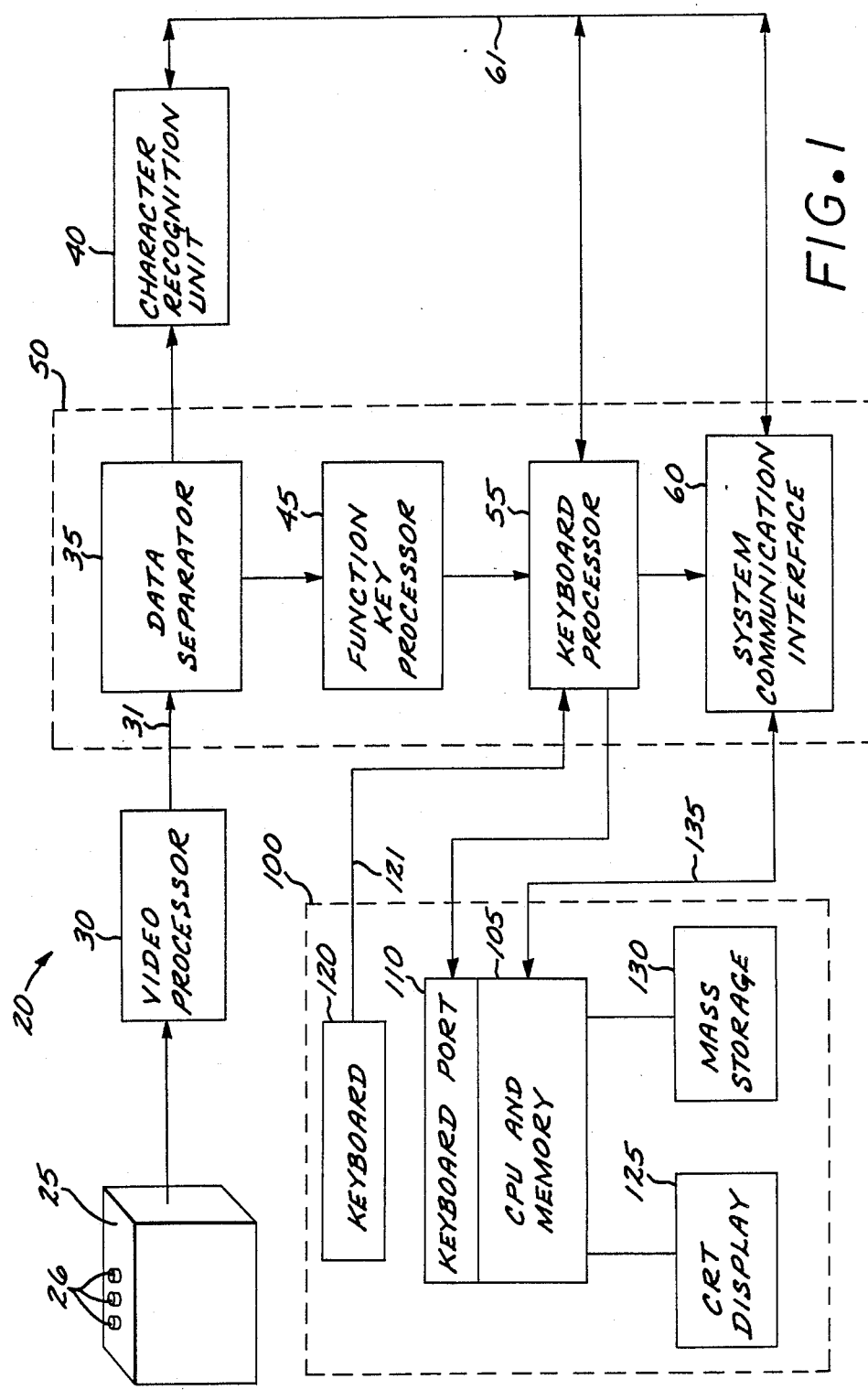
FIG. 1 is a simplified functional block diagram of an interactive optical scanner system embodying the invention.

FIG. 1 illustrates a simplified functional block diagram of an interactive optical scanner system employing the invention. The scanner system comprises a hand-held optical scanner or camera 25, a video processor 30, an event/character data sequencer 35, a character recognition unit 40, a function key processor 45, a keyboard processor 55, and system communication interface 60, in combination with a host computer or terminal 100.

The camera 25 comprises a housing suitable for hand-held use which contains an opto-electronic transducer for optically and electronically capturing images of characters in a written medium, such as text which is printed, typed, or handwritten on paper. In one preferred embodiment, the opto-electronic transducer comprises a 64×256 pixel photosensitive array for capturing successive optical image frames or frame segments in a stroboscopic fashion. The camera further comprises an internal light source for illuminating the surface of the medium bearing the characters. In a preferred form, the light source comprises two LED devices and an LED driver circuit capable of rapidly turning the LED devices on and off at a rapid repetition rate, with the turn-on time or duty cycle at which the LEDs are operated, also referred to as the camera exposure, being selectively variable in accordance with the reflectivity of the medium. Thus, the illumination source is a form of a stroboscopic light source illuminating the medium surface.

With the stroboscopic light source in operation, as the camera 25 is moved by hand along a line of characters, for example, a line of text printed on paper, light generated by the light source is projected onto the medium surface, and reflected therefrom onto the opto-electronic array, the intensity of the reflected light being spatially modulated in accordance with the particular character or characters being scanned. The opto-electronic array transforms the optical-character data in the reflected light into digital data, with each pixel having a binary "1" or "0" associated therewith, with one value representing white and the other value representing black. After a frame has been captured by the array, the digital image data may be read out of the array as a sequence of digital video data.

The system 20 further comprises a video processor 30 which receives the digital video data representing each image or frame from the opto-electronic transducer. The video processor 30 controls the camera exposure control function and performs correlation functions on the successive frames of the video data to provide a sequence of edited video data frames or frame segments, in the form of a data packet for each frame or frame segment, wherein duplicative character data have been removed from the edited frames. The result is video data representing a sequence of frames or frame segments, analogous to a "filmstrip," which capture the character sequence, but which do not contain duplicative character data. Preferably, the video processor is embodied in one or more integrated circuits contained within the housing of the hand-held camera 25, although it may be located at an external location. The output of the processor 30 comprises a digital bit stream of packets of video image data and associated camera status data packets.

In accordance with the invention, the camera 25 further comprises a plurality of camera function keys 26 which are positioned to allow tactile operation by the user while holding the camera 25. These keys may comprise, for example, normally open spring-biased push-button switches. The status of the keys is monitored, and the event of key-closure or release results in issuance of a particular key token signal corresponding to the particular key. One of the keys is employed as a scanner enable control actuated by the user to enable the optical scanning functions of the camera 25. The purpose of the camera function controls is described below. The camera status data packets define the current status of each camera function key with each packet of video frame data having a corresponding status data packet.

The edited video data from the video processor 30 and camera key status signals representing the status of the camera function keys 26 are respectively coupled via a multi-wire electrical cable 31 to the data separator 35. A camera function key actuation or release generates a corresponding key token signal at the chronological point of actuation, which may only be recognized by the system when the optical scanning function of the camera is not enabled, i.e., when the scanner enable control has not been activated by the user. Alternatively, the system may be configured so that the function keys will be recognized regardless of the status of the optical scanning function. The data separator 35 uses the chronological order of a particular video data frame by the opto-electronic array and generation of a particular camera function key token to direct the edited video data from the video processor to the character recognition unit 40, and the camera function key tokens to the function key processor 45.

The edited video character data is processed by the character recognition unit 40 to isolate and extract topological features of each unknown character which may be used to uniquely identify the character. The topological features principally include features of a particular character such as vertical and horizontal line segments, left-facing diagonal line segments, right-facing diagonal line segments, upwardly facing arc segments, downwardly facing arc segments, left facing arc segments, right facing arc segments, horizontal up-down line transitions, vertical left-right line transitions, horizontal line crossings and line intersections. Once the features of the unknown character have been isolated and extracted, they may be compared to the predetermined features of known characters which are stored in a character dictionary comprising the unit 35 to identify the character. The character recognition processor then emits a character digital data sequence or token uniquely identifying the recognized character on bus 61.

The function key processor 45 receives the camera function key token data signals from the data separator 35 and, as will be described more fully below, translates the respective function key token into an intended output data sequence which is provided to the keyboard processor 55.

The scanner system further comprises a system communication interface 60, which is coupled to processors 40, 45 and 55 via interface bus 61. The system communication interface 60 communicates with host computer or terminal 100 via its CPU and peripheral bus 135. The host computer or terminal 100 may comprise, for example, a personal computer system such as the IBM PC or a terminal such as the IBM 3270 or 32XX family of terminals. In the following it will be understood that reference to computer 100 is intended in a general sense, so as to include various computer systems, including personal, mini or main frame computers with terminals, and the like. The computer 100 typically comprises central processor unit (CPU) and memory 105, keyboard 120, mass storage 130 and CRT display 125 The elements of computer 100 are conventional in nature, allowing the system user to communicate with the CPU 105 via the keys of the keyboard 120, which provides keyboard character and function key data.

In this embodiment, the keyboard umbilicus cable 121 is connected to the keyboard processor 55, instead of directly to the keyboard port 110 of CPU 105, as is the conventional manner of interconnection. The keyboard 120 represents the conventional keyboard of the computer 100 and, as is well known, includes a plurality of operator-actuated key, to which are assigned particular alpha-numeric characters, and which may also have assigned one or more additional functions activated, e.g., as in the case of the IBM PC computer, by the "CTRL" function key, "ALT" key, or combinations of "CTRL" and "ALT" keys. The keyboard may also further comprise a plurality of dedicated keyboard function keys, including for example, keys respectively labelled "F1" to "F10." The particular function activated by a particular function key is dependent on the particular software being run on the personal computer or terminal. By way of example, function key F1 for a particular software program may activate a user "help" menu.

The keyboard processor 55 receives keyboard signals from keyboard 120 in the form of the device-specific keyboard scan codes, a bit stream representing the results of the operator keystrokes. The keyboard processor 55 also receives the character tokens from the character recognition unit 45, and the camera function key output sequences from the function key processor 45. The processor 55 transforms the respective character tokens and camera function key output data sequences into the corresponding device-specific scan code for the particular host computer 100. This processing may be accomplished using look-up tables to provide the particular device-specific code corresponding to a particular character token or camera function key output data sequence, as will be described in more detail below. The keyboard processor 55 merges the respective scan codes resulting from the camera function key output sequences from the processor 45 and the character tokens from the processor 40 in the appropriate chronological order. The merged scan code bit stream is buffered and then provided to the CPU 105 via keyboard port 120 at the appropriate bit rate and with the appropriate protocol, as will be apparent to those skilled in the art.

While FIG. 1 depicts a simplified functional block diagram of the system, it is to be understood that the functions of the various blocks may be implemented in a combination of hardware and software. For example, the functions of the respective processors 45, 55 and 60 and separator 35 may be carried out by a microcomputer (e.g., a Motorola 68000 microcomputer), represented generally as phantom block 50, programmed in the appropriate manner.

As described above, the keyboard processor transforms the character tokens and camera function key processor output sequences into the device-specific keyboard scan code employed by computer 100. This allows the system user to enter and edit in real time the character data being captured by the camera 25, in a manner which emulates the entry of data and function codes through the keyboard. For example, if the text being scanned by the camera 25 comprises the word "cat," the resulting output from system 20 to the computer 100 is a digital bit stream or scan code which emulates the corresponding scan code from the keyboard 120 which would be generated if the word "cat" were manually entered on the keyboard 120.

The camera function keys 26 on camera 25 further provide the capability of emulating the function or character keys comprising keyboard 120 or selected sequences of a plurality of function or character keys. As will be described in further detail, means are provided to enable the system user to program the particular application function or sequences of application functions associated with predetermined ones of the camera function keys 26.

The keyboard processor 55 and interface unit 60 are preferably arranged to allow the system user to interface with the computer 100 either through keyboard 120 or via camera 25. Thus, when entering text into the computer 100 as in a word processing application, the system user may manually enter passages of text via conventional keyboard manipulation, and, as appropriate, enter text passages from another document via the camera 25.

Figure 2:
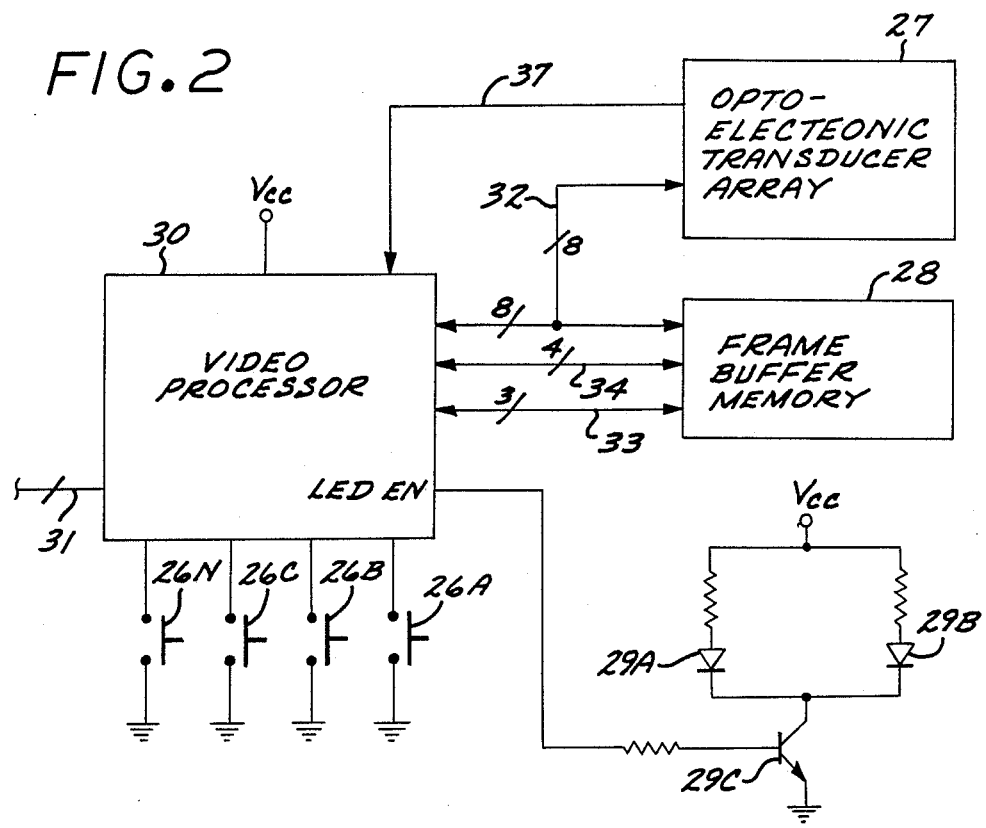
FIG. 2 is a simplified electric schematic block diagram of electrical elements comprising the hand-held optical scanner.

Referring now to FIG. 2, a block diagram of the main electrical elements of camera 25 is shown. In this diagram the video processor 30 is shown in the form of an integrated circuit located within the housing of the camera 25. The camera 25 comprises the opto-electronic transducer array 27 and a frame buffer memory 28, which are coupled to the video processor 32 by address bus 32. A control bus 33 between the video processor and the frame buffer 28 provides the control lines needed for the processor 30 to control the frame buffer 28. Serial video data is transferred from array 27 to processor 30 over line 37.

The cooperation of the array 27 and frame buffer 28 permits the video processor 30 to perform a correlation process between successive image data frames to eliminate duplicative character information. The frame buffer is employed to store the three most current frames of image data. By comparing two successive data frames resulting from scanning of the camera along a line of character text, for example, the image data which is overlapped between the two frames, i.e., duplicated, or frame segment may be identified so that an edited image frame may be constructed which contains only new image data, i.e., data not captured in the previous data frame. The edited frame data is then transmitted via bus 31 to the data separator 35 for further processing as described above.

An exemplary commercial device suited for use as the photosensitive array is the model IS32A product marketed by Micron Technology, Inc., Boise, Id. This device is functionally a 64K dynamic random access memory, packaged to allow an image to be focussed directly on the silicon die.

The video processor 30 also controls the camera light source, which comprises in this embodiment two light emitting diodes (LEDs) 29A and 29B. The video processor controls the application of DC power to the LEDs 29A and 28B by gating transistor 29C on and off. Thus, the processor 30 may control the duty cycle and repetition rate at which the LEDs are operated. Each cycle comprises a programmable "soak" time period during which the LEDs are turned on to illuminate the medium, a "read" period during which the pixels of the array 27 are read, a refresh time period during which the array pixels are refreshed to an initial state, and a programmable wait time period. The light source illuminates the medium only during the "soak" interval; since the transducer array is not illuminated with reflected light during the array "read" time period, blurring of the resultant image is reduced. An exemplary cycle length at which the system may be operated is 4 milliseconds. The "soak" time period, i.e., the time period during each cycle that the array 27 is exposed to the scanned image, is adjusted as a function of the reflective characteristics of the medium. A typical soak or exposure time is one millisecond, although colored backgrounds can have exposure times as high as three milliseconds.

Figure 3:
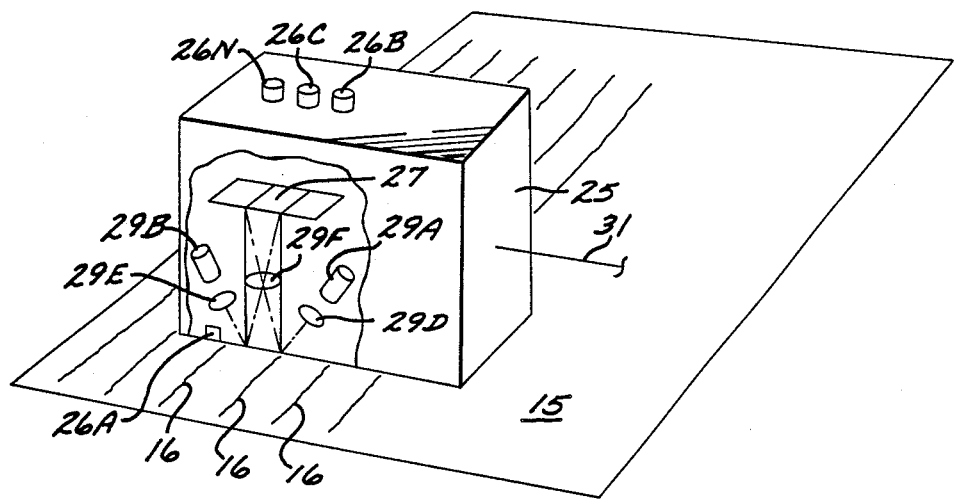
FIG. 3 is a broken-away diagrammatic perspective view of the hand-held optical scanner, showing its principle optical elements.

Referring now to FIG. 3, a simplified broken-away perspective view of the camera 25 is shown in position on a page bearing lines of characters to be scanned. FIG. 3 illustrates in general the optical elements of the camera 25 and the associated switches 26A-N. As generally depicted in FIG. 3, the LEDs 29A and 29B are arranged to direct the generated light via respective lens elements 29D and 29E onto the surface of the medium 15 bearing the lines 16 of character such that the reflected light will be directed by lens 29F onto the opto-electronic transducer array 27. An on-page sensor switch 26A is located as to be activated when the camera is disposed in position on the medium. Camera function keys 26B-D are located along a surface of the camera 25 to allow operator manipulation thereof.

Referring again to FIG. 1, the function key processor 45 translates the camera function key tokens into an intended output sequence, which is in turn translated by the keyboard processor 55 into the device-specific scan codes to be sent to the CPU 105. In a preferred embodiment, the function key processor 45 employs a first look-up table, the "output" table, stored in memory to perform the translation from the particular camera function key token signal to the intended output sequence. The keyboard processor 55 employs a second look-up table, the "keyboard" table, to translate the respective output sequences into the corresponding keyboard scan codes for the particular host computer.

In accordance with the invention, means are provided to allow the user to read the output look-up table stored in the function key processor 45, edit the table and write the modified output table back to the processor 45. Once modified, an output table may also be stored, e.g., in the mass storage unit 130 of computer or terminal 100, so that it may be recalled and reused. This allows the user to create different output look-up tables customized to the needs of different applications.

The output table includes entries for the pressing and the release of each of the available camera function keys (e.g., F1UP, F1DN, F2UP, F2DN, F3UP, F3DN in the examples to be discussed below). By editing the output table character strings associated with a camera function key, its behavior can be altered to fit the need of a particular application or user. Sequences of non-ASCII (USA Standard Code for Information Interchange (USASCII X3.4-1967)) characters or functions are handled by using a numeric value as an index in a keyboard table containing the codes necessary to produce these non-ASCII values on the host computer 100.

A portion of an exemplary keyboard table for a host IBM PC computer is set forth in Table I. The keyboard table allows the output table values (from processor 45) and the character token values (from processor 40) to be mapped into the corresponding keyboard scan code. The choice of the particular scan code will be dependent on the particular scan code utilized by the host computer 100.

TABLE I
PORTION OF EXEMPLARY KEYBOARD TABLE

| Output Table Value | Description | IBM KeyBoard Code |
|---|---|---|
| . | . | . |
| . | . | . |
| . | . | . |
| 237 | F1 | /3b |
| 238 | F2 | /3c |
| 239 | F3 | /3d |
| 240 | F4 | /3e |
| 241 | F5 | /3f |
| 242 | F6 | /40 |
| 243 | F7 | /41 |
| 244 | F8 | /42 |
| 245 | F9 | /43 |
| 246 | F10 | /44 |
| 247 | HOME | /47 |
| 248 | UP ARROW | /48 |
| 249 | PGUP | /49 |
| 250 | LEFT ARROW | /4b |
| 251 | CEN | /4c |
| 252 | RIGHT ARROW | /4d |
| 253 | END | /4f |
| 254 | DOWN ARROW | /50 |
| 255 | PGDN | /51 |

Table II (below) shows a generic output table comprising ASCII default strings that identify each of the camera function keys F1, F2, F3 (corresponding to particular ones of the camera function keys 26A–26N). The index values correspond to particular events, e.g., index value 5 corresponds to the event that camera function key F1 is "down" or actuated. These default strings indicate that no values have yet been assigned to the camera function keys F1–F3.

TABLE II
GENERIC OUTPUT TABLE

| Index | Name | Output |
|---|---|---|
| 0 | NULL | |
| 1 | BOS | |
| 2 | EOS | /0d |
| 3 | ERR | * |
| 4 | F1UP | |
| 5 | F1DN | [F1] |
| 6 | F2UP | |
| 7 | F2DN | [F2] |
| 8 | F3UP | |
| 9 | F3DN | [F3] |
| 10 | GOUP | |

TABLE II-continued
GENERIC OUTPUT TABLE

| Index | Name | Output |
|---|---|---|
| 11 | GODN | [GO] |
| 12 | TREN | [TREN] |
| 13 | TRDI | [TRDI] |
| 14 | BARR | [BARR] |
| 15 | A | A |
| 16 | B | B |

Table III (below) is an exemplary output table showing typical camera function key assignments for use with a spreadsheet software program running on the host computer 100. When mapped through the keyboard table (Table I), these camera key assignments will produce a left arrow (output sequence /250) for camera function key F1, a right arrow (output sequence /252) for camera function key F2, and a down arrow (output sequence /254) for camera function key F3. This facilitates movement from field to field within the spreadsheet while entering data using camera 25, without requiring the user to put down the camera 25 and use the arrow keys on the computer keyboard. Instead, the user simply manipulates the camera function keys F1–F3.

TABLE III

| Index | Name | Output |
|---|---|---|
| 0 | NULL | |
| 1 | BOS | |
| 2 | EOS | /252 |
| 3 | ERR | * |
| 4 | F1UP | |
| 5 | F1DN | /250 |
| 6 | F2UP | |
| 7 | F2DN | /252 |
| 8 | F3UP | |
| 9 | F3DN | /254 |
| 10 | GOUP | |
| 11 | GODN | [GO] |
| 12 | TREN | [TREN] |
| 13 | TRDI | [TRDI] |
| 14 | BARR | [BARR] |
| 15 | A | A |
| 16 | B | B. |

Table IV (below) illustrates an output table modified for use with a word processor user program. Only one camera function key has been assigned a value; camera key F3 will produce a left arrow followed by a "CONTROL Y" key signal which for a particular word processor program (e.g., "Wordstar") will delete the last line of the document currently being entered. This illustrates the capability of the user assigning to a particular camera function key a specified sequence of a plurality of keystrokes otherwise required on the host computer keyboard, i.e., a left arrow followed by a "control Y."

TABLE IV

| Index | Name | Output |
|---|---|---|
| 0 | NULL | |
| 1 | BOS | |
| 2 | EOS | /013 |
| 3 | ERR | * |
| 4 | F1UP | |
| 5 | F1DN | |
| 6 | F2UP | |
| 7 | F2DN | |
| 8 | F3UP | |
| 9 | F3DN | /250/025 |
| 10 | GOUP | |

TABLE IV-continued

| Index | Name | Output |
|---|---|---|
| 11 | GODN | [GO] |
| 12 | TREN | [TREN] |
| 13 | TRDI | [TRDI] |
| 14 | BARR | [BARR] |
| 15 | A | A |
| 16 | B | B |

The output table set forth in Table V (below) is similar to that of Table IV, and produces a similar functional operation except that the function sequence has been assigned to the camera F1 key instead of the camera F3 key. This could be used to place the operation under the index finger of a person scanning left-handed instead of right-handed.

TABLE V

| Index | Name | Output |
|---|---|---|
| 0 | NULL | |
| 1 | BOS | |
| 2 | EOS | /013 |
| 3 | ERR | * |
| 4 | F1UP | |
| 5 | F1DN | /250/025 |
| 6 | F2UP | |
| 7 | F2DN | |
| 8 | F3UP | |
| 9 | F3DN | |
| 10 | GOUP | |
| 11 | GODN | [GO] |
| 12 | TREN | [TREN] |
| 13 | TRDI | [TRDI] |
| 14 | BARR | [BARR] |
| 15 | A | A |
| 16 | B | B |

The preferred physical implementation of function blocks 35, 40, 45, 55 and 60 are as one or more integrated circuits mounted on a circuit board for a plug-in connection in an expansion board slot in the host computer, such as the IBM PC. As will be apparent to those skilled in the art, with the interface to the peripheral bus 135 of the host computer, a computer utility program may be entered through CPU 105 via a disk drive, for example, which allows the system user to read the output table from the memory of function key processor 45, write it to the CPU memory and the CRT display 125, edit the table according to the needs of the particular application, as illustrated above, and then to write it back to the function key processor memory scanner system use. The computer 100 may further be adapted to store in mass storage 130 a plurality of application-specific output tables, so that the user need only select the desired table, and write it to the function key processor memory for use in the desired application.

Although the keyboard scan codes issued by the keyboard processor 55 are described above as being directed through the keyboard port 120, in some applications, it may be preferable to communicate the keyboard scan code information directly through the bus 135. In this alternate embodiment, the keyboard 110 is connected to the keyboard port 120 in the conventional manner, and the CPU 105 is instructed to monitor the keyboard port 110 and the system bus 135 for keyboard scan code data. For most personal computer, this can be readily accomplished by suitably modifying the basic input-output system (BIOS) of the computer.

It is understood that the above-described embodiment is merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. An interactive optical scanner system comprising:
    a host computer comprising a central processor and a keyboard having a plurality of keyboard character and keyboard function keys to provide keyboard character and function data to the central processor in accordance with predetermined keyboard codes;
    a camera housing suitable for hand-held use;
    an opto-electronic transducer array disposed within said housing for capturing successive images of characters on a medium surface and providing digital video signals representative of said images;
    a plurality of tactilely-operated camera function keys disposed on said housing for providing respective function token signals corresponding to each camera function key in dependence on the user manipulation thereof;
    user-programmable means responsive to said respective camera function key token signals for associating a particular token signal with a respective programmable output value corresponding to one or more keyboard character or keyboard function keys;
    means for transforming said respective output values into scanner system signals corresponding to said corresponding keyboard codes; and
    means for coupling said scanner system signals to said central processor unit of that said camera function key manipulation emulates the operation of one or more of said keyboard keys.

2. The scanner system of claim 1 wherein said user-programmable means comprises:
    a function key processor comprising an output look-up table stored in a function key memory and having a plurality of output values stored in correspondence with a predetermined camera function key token signal value; and
    means for allowing the user to read the contents of said output look-up table and to program the output values in a desired manner.

3. The scanner system of claim 1 wherein said user-programmable means is adapted to allow the user to associate a particular camera function key token signal with a programmed sequence of output values corresponding to a desired sequence of a plurality of keyboard character or function keys.

4. The scanner system of claim 2 wherein said means for transforming said respective output values comprises a keyboard processor including a keyboard look-up table stored in memory and having a plurality of keyboard code values stored in correspondence with a predetermined output signal value.

5. The scanner system of claim 4 wherein said host computer keyboard is coupled to said keyboard processor, said central processor includes a keyboard port for receiving said keyboard codes, and said means for coupling said scanner system signals to said central processor comprises an electrical connection between said keyboard processor and said keyboard port of said central processor.

6. The scanner system of claim 2 wherein said central processor comprises a memory, and said central processor is adapted to store a plurality of output look-up tables each tailored to a particular used application, and to write a desired one of said stored tables to said function key memory for scanner system use.

* * * * *